US009767710B2

(12) United States Patent
Lee et al.

(10) Patent No.: US 9,767,710 B2
(45) Date of Patent: Sep. 19, 2017

(54) APPARATUS AND SYSTEM FOR SPEECH INTENT RECOGNITION

(75) Inventors: Sung Jin Lee, Pohang-si (KR); Cheong Jae Lee, Pohang-si (KR); Gary Geunbae Lee, Pohang-si (KR)

(73) Assignee: POSTECH ACADEMY-INDUSTRY FOUNDATION, Pohang-si, Gyeongsangbuk-Do (KR)

( * ) Notice: Subject to any disclaimer, the term of this patent is extended or adjusted under 35 U.S.C. 154(b) by 798 days.

(21) Appl. No.: 13/515,811

(22) PCT Filed: Oct. 15, 2010

(86) PCT No.: PCT/KR2010/007073
§ 371 (c)(1),
(2), (4) Date: Jun. 13, 2012

(87) PCT Pub. No.: WO2011/074771
PCT Pub. Date: Jun. 23, 2011

(65) Prior Publication Data
US 2012/0290300 A1 Nov. 15, 2012

(30) Foreign Application Priority Data

Dec. 16, 2009 (KR) .................. 10-2009-0125469

(51) Int. Cl.
*G10L 15/00* (2013.01)
*G09B 19/06* (2006.01)
*G09B 19/04* (2006.01)

(52) U.S. Cl.
CPC ............. *G09B 19/06* (2013.01); *G09B 19/04* (2013.01)

(58) Field of Classification Search
CPC ..... G10L 15/18; G10L 15/186; G10L 15/063; G10L 2015/0633; G10L 15/22;
(Continued)

(56) References Cited

U.S. PATENT DOCUMENTS 5,493,608 A * 2/1996 O'Sullivan ............... 379/88.04
6,199,067 B1 * 3/2001 Geller ............... G06F 17/30702
(Continued)

FOREIGN PATENT DOCUMENTS

CN 101178705 5/2008
JP 07-239694 A 9/1995
(Continued)

OTHER PUBLICATIONS

Hideki Yamamoto et al., "The Intension of the Student and the Conversation Control Method in an Intelligent CAI system for Training a Foreign Language", Transaction of Information Processing of Japan, Information Processing Society of Japan, vol. 31, No. 6, Jun. 1990.
(Continued)

*Primary Examiner* — Abdelali Serrou
(74) *Attorney, Agent, or Firm* — Kile Park Reed & Houtteman PLLC

(57) ABSTRACT

The apparatus for foreign language study includes: a voice recognition device configured to recognize a speech entered by a user and convert the speech into a speech text; a speech intent recognition device configured to extract a user speech intent for the speech text using skill level information of the user and dialog context information; and a feedback processing device configured to extract a different expression depending on the user speech intent and a speech situation of the user. According to the present invention, the intent of a learner's speech may be determined even though the learner's skill is low, and customized expressions for various situations may be provided to the learner.

10 Claims, 4 Drawing Sheets

(58) Field of Classification Search
CPC . G10L 15/1822; G10L 15/1815; G10L 15/26;
G10L 15/265; G10L 15/30; G10L
2015/223; G10L 21/06; G10L 25/48;
G09B 19/06; G09B 19/04; G06F
17/30864; G06F 17/277; G06F 17/27;
G06F 17/276; G06F 17/278; G06F
17/30654; G06F 17/30687; G06F
17/3069; G06F 17/30731; G06F
17/30896; G06F 17/30976; G06F
17/2785; G06F 17/28; G06F 17/271;
G06F 17/274; G06F 17/279; G06F
17/30684; G06F 17/3087; G06F 3/167;
G06F 9/54
USPC ......................................................... 704/251
See application file for complete search history.

(56) References Cited

U.S. PATENT DOCUMENTS

| | | | | |
|---|---|---|---|---|
| 6,405,170 | B1* | 6/2002 | Phillips | G10L 15/22 379/88.02 |
| 7,890,326 | B2* | 2/2011 | Strope et al. | 704/251 |
| 8,600,746 | B1* | 12/2013 | Lei | G10L 15/22 704/235 |
| 2002/0087315 | A1* | 7/2002 | Lee | G06Q 30/06 704/9 |
| 2002/0133337 | A1* | 9/2002 | Anderson | G10L 15/26 704/231 |
| 2003/0125955 | A1* | 7/2003 | Arnold | G10L 15/30 704/270.1 |
| 2003/0149561 | A1* | 8/2003 | Zhou | G10L 15/26 704/240 |
| 2003/0182131 | A1* | 9/2003 | Arnold | G10L 15/32 704/275 |
| 2005/0154694 | A1* | 7/2005 | Muller | G06F 17/30648 |
| 2005/0165602 | A1* | 7/2005 | Cote et al. | 704/9 |
| 2006/0149544 | A1* | 7/2006 | Hakkani-Tur | G10L 15/22 704/236 |
| 2006/0184370 | A1* | 8/2006 | Kwak et al. | 704/275 |
| 2006/0224552 | A1* | 10/2006 | Riezler | G06F 17/30702 |
| 2007/0156392 | A1* | 7/2007 | Balchandran | G06F 17/27 704/9 |
| 2008/0010069 | A1* | 1/2008 | Katariya | G06F 9/4443 704/257 |
| 2008/0209349 | A1* | 8/2008 | Macadaan | G06F 3/0482 715/762 |
| 2008/0281598 | A1* | 11/2008 | Eide | G10L 15/22 704/270 |
| 2009/0228439 | A1* | 9/2009 | Manolescu | G06F 17/30864 |
| 2009/0292528 | A1* | 11/2009 | Kameyama | G08G 1/0962 704/9 |
| 2009/0327417 | A1* | 12/2009 | Chakra | G06Q 10/10 709/204 |
| 2010/0076765 | A1* | 3/2010 | Zweig | G10L 15/1822 704/255 |
| 2010/0228777 | A1* | 9/2010 | Imig | G06F 17/30699 707/772 |
| 2010/0250529 | A1* | 9/2010 | Surendran | G06Q 30/02 707/732 |
| 2011/0078160 | A1* | 3/2011 | Gotz | G06F 17/30864 707/750 |
| 2013/0339021 | A1* | 12/2013 | Deshmukh | G10L 15/18 704/257 |

FOREIGN PATENT DOCUMENTS

| | | |
|---|---|---|
| JP | 2600081 | 1/1997 |
| JP | 10-326074 | 12/1998 |
| JP | 10-326074 A | 12/1998 |
| JP | 2003-22086 | 1/2003 |
| KR | 10-2005-0021143 A | 3/2005 |
| KR | 10-2006-0070605 A | 6/2006 |
| KR | 10-2007-0090642 A | 9/2007 |
| KR | 10-2007-0114530 A | 12/2007 |

OTHER PUBLICATIONS

Hideki Yamamoto et al.,"ICAI system for Conversational English Based on Spoken Discourse Simulation", Transaction of Information Processing of Japan, Information Processing Society of Japan, vol. 34, No. 9, Sep. 1993.
International Search Report of International Application No. PCT/KR2010/007073, dated Jun. 23, 2011.
PCT Written Opinion of the International Search Authority for International Application No. PCT/KR2010/007073, dated Jun. 23, 2011.
Donghyun Kim, et al.; "Speakers' Intention Prediction Using Statistics of Multi-level Features in a Schedule Management Domain", Proceedings of the 4th Annual Meeting of the Association for Computational Linguistics on Human Language Technologies Short Papers,, HLT '08, Jun. 17, 2008, pp. 229-232.
Mariet Theune, "Natural Language Generation for dialogue: system survey", Parlevink Language Engineering Group, May 6, 2003.
Douglas O'Shaughnessy: "Speech Processing"; Encyclopedia of Telecommunications, Apr. 15, 2003; pp. 1-22.
Summons to attend oral proceedings pursuant to Rule 115(1) EPC for European Patent Application No. 10 837 768.0, dated May 20, 2016; pp. 1-9.

* cited by examiner

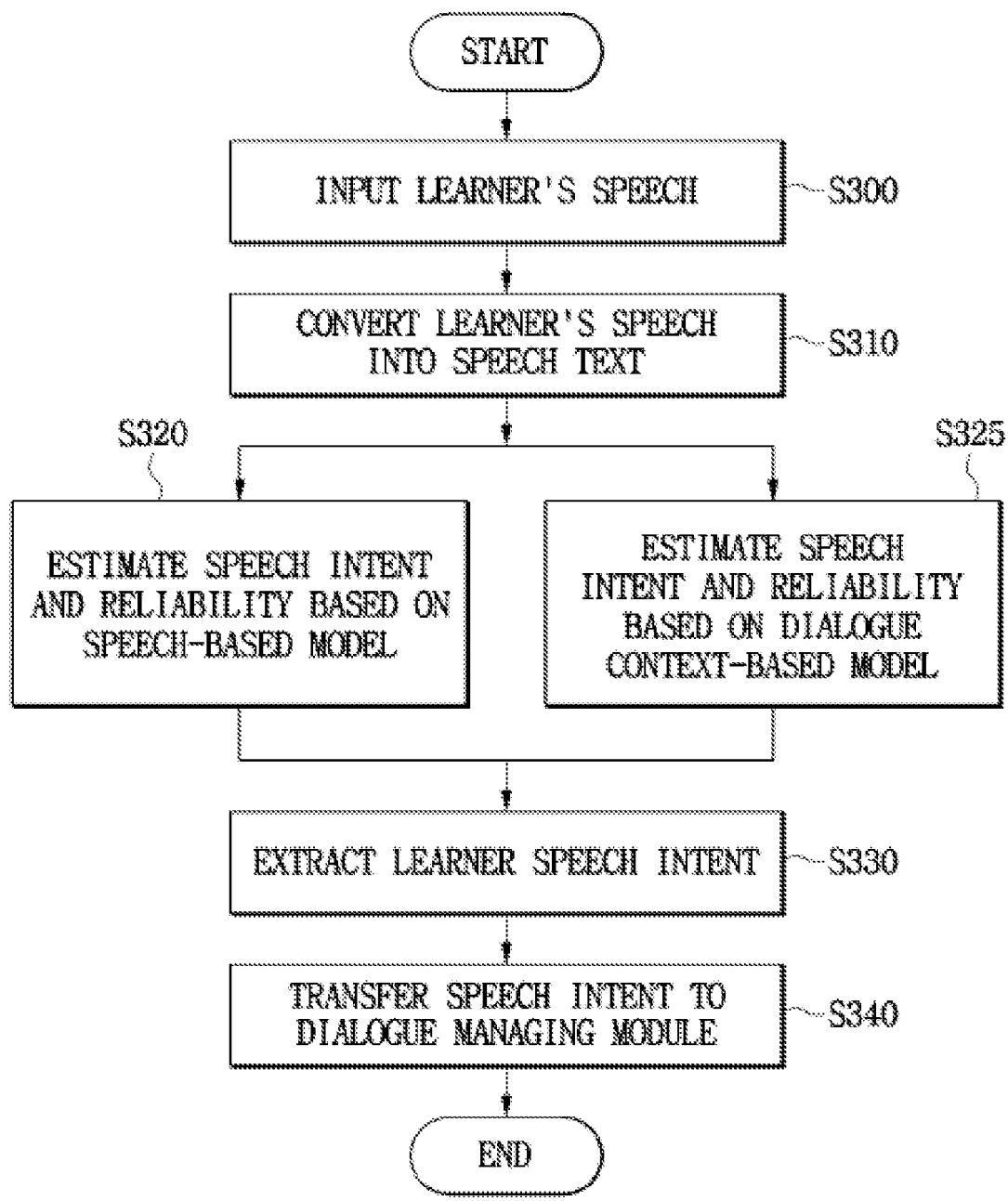

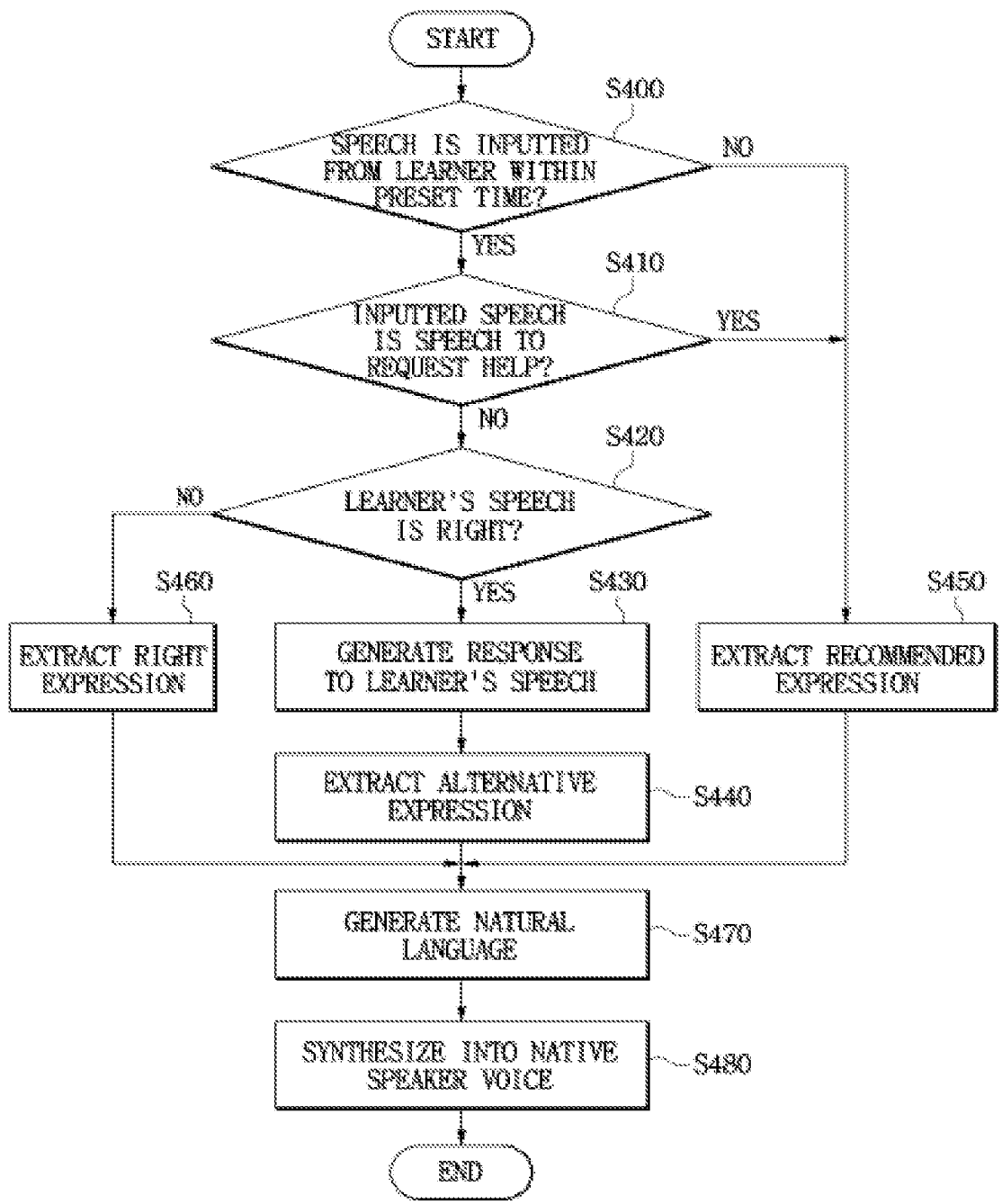

APPARATUS AND SYSTEM FOR SPEECH INTENT RECOGNITION

BACKGROUND OF THE INVENTION

Field of the Invention

The present invention relates to an apparatus and method for foreign language study.

Description of the Related Art

In general, the most effective method for foreign language conversation education is that a native speaker teacher and a student have a one-to-one talk with each other. However, since such a method requires a lot of cost, it is difficult for many students to receive the benefits of the education.

Recently, much research has been actively conducted on a voice-based natural language conversation system using an artificial intelligence natural language processing technology capable of replacing a native speaker teacher. However, most of existing voice recognition devices has been developed for native speakers. Therefore, when the voice recognition devices are used for voice recognition of non-native speakers, they exhibit very low recognition performance.

Because of the technical limitation of voice recognition, it is actually impossible for a learner to freely enter a speech. Therefore, most of current conversation systems for foreign language study are generally utilized in a limited manner based on a scenario. According to the foreign language learning theory, however, it is known that learners test and learn their foreign language skill through responses of the others to speeches entered by the learners. Therefore, most of the existing conversation systems which always offers the same response based on a scenario may not provide a satisfactory learning effect.

SUMMARY OF THE INVENTION

Accordingly, the present invention has been made in an effort to solve the problems occurring in the related art, and an object of the present invention is to provide an apparatus and method for foreign language study, which is capable of determining the intent of a learner's speech and providing a response coinciding with the speech intent to the learner even though the learner's skill level is low, and providing customized expressions for various situations to the learner.

In order to achieve the above object, according to one aspect of the present invention, an apparatus for foreign language study includes: a voice recognition device configured to recognize a speech entered by a user and convert the speech into a speech text; a speech intent recognition device configured to extract a user speech intent for the speech text using skill level information of the user and dialogue context information; and a feedback processing device configured to extract a different expression depending on the user speech intent and a speech situation of the user.

The speech intent recognition device may extract the user speech intent using a plurality of speech-based models which are separately generated for skill levels of the user and a dialogue context-based model generated by considering a dialogue context.

The speech intent recognition device may select a speech-based model based on the skill level information of the user, estimate a speech intent for the speech text using the selected speech-based model, and estimate a speech intent based on the dialogue context information using the dialogue context-based model.

The speech intent recognition device may statistically synthesize the speech intent based on the speech-based model and the speech intent based on the dialogue context-based model, and extract the user speech intent.

The apparatus may further include a dialogue managing module configured to generate a response to the speech text according to the user speech intent and the dialogue context information.

When a speech of the user is not inputted within a preset time or a help request is made from the user, the feedback processing device may extract a recommended expression from a database and provides the recommended expression to the user.

When the user's speech is not right, the feedback processing device may extract a right expression from a database and provides the right expression to the user.

When the user's speech is right, the feedback processing device may extract an alternative expression having the same meaning as or a similar meaning to the user's speech from a database, and provides the alternative expression to the user.

The apparatus may further include a natural language generating device configured to convert the expression extracted by the feedback processing device into a natural language speech; and a voice synthesizing device configured to synthesize the natural language speech converted by the natural language generating device into a voice.

According to another aspect of the present invention, an apparatus for foreign language study includes: a voice recognition device configured to recognize a speech entered by a user and convert the speech into a speech text; a speech intent recognition device configured to extract a user speech intent for the speech text; and a feedback processing device configured to extract a recommended expression, a right expression, or an alternative expression according to the user speech intent and a speech situation of the user, and provides the extracted expression to the user.

The feedback processing device may extract the recommended expression from a database when a speech of the user is not inputted within a preset time or a help request is made from the user, extract the right expression from a database when the user's speech is not right, and extract the alternative expression from a database when the user's speech is right.

According to another aspect of the present invention, a dialogue system includes: a voice recognition device configured to recognize a speech entered by a user and convert the speech into a speech text; and a speech intent recognition device configured to extract a user speech intent for the speech text using a plurality of speech-based models which are separately generated for skill levels of the user and a dialogue context model generated by considering a dialogue context.

The speech intent recognition device may select a speech-based model based on skill level information of the user, estimate a speech intent for the speech text using the selected speech-based model, and estimate a speech intent based on the dialogue context information using the dialogue context-based model.

The speech intent recognition device may statistically synthesize the speech intent based on the speech-based model and the speech intent based on the dialogue context-based model, and extract the user speech intent.

According to another aspect of the present invention, a method for foreign language study includes: recognizing a speech entered by a user and converting the speech into a speech text; extracting a user speech intent for the speech text using skill level information of the user and dialogue context information; and extracting a different expression depending on the user speech intent and a speech situation of the user.

According to another aspect of the present invention, a method for foreign language study includes: recognizing a speech entered by a user and converting the speech into a speech text; extracting a user speech intent for the speech text; and extracting a recommended expression, a right expression, or an alternative expression according to the user speech intent and a speech situation of the user, and providing the extracted expression to the user.

According to another aspect of the present invention, a method for providing a dialogue includes: recognizing a speech entered by a user and converting the speech into a speech text; and extracting a user speech intent for the speech text using a plurality of speech-based models which are separately generated for skill levels of the user and a dialogue context-based model generated by considering a dialogue context.

BRIEF DESCRIPTION OF THE DRAWINGS

The above objects, and other features and advantages of the present invention will become more apparent after a reading of the following detailed description taken in conjunction with the drawings, in which:

FIG. 3 is a flow chart showing a process of extracting a speech intent according to a method for foreign language study in accordance with another embodiment of the present invention; and FIG. 4 is a flow chart showing a process of responding to a learner according to the method for foreign language study in accordance with the embodiment of the present invention.

DETAILED DESCRIPTION OF PREFERRED EMBODIMENTS

Figure 1:
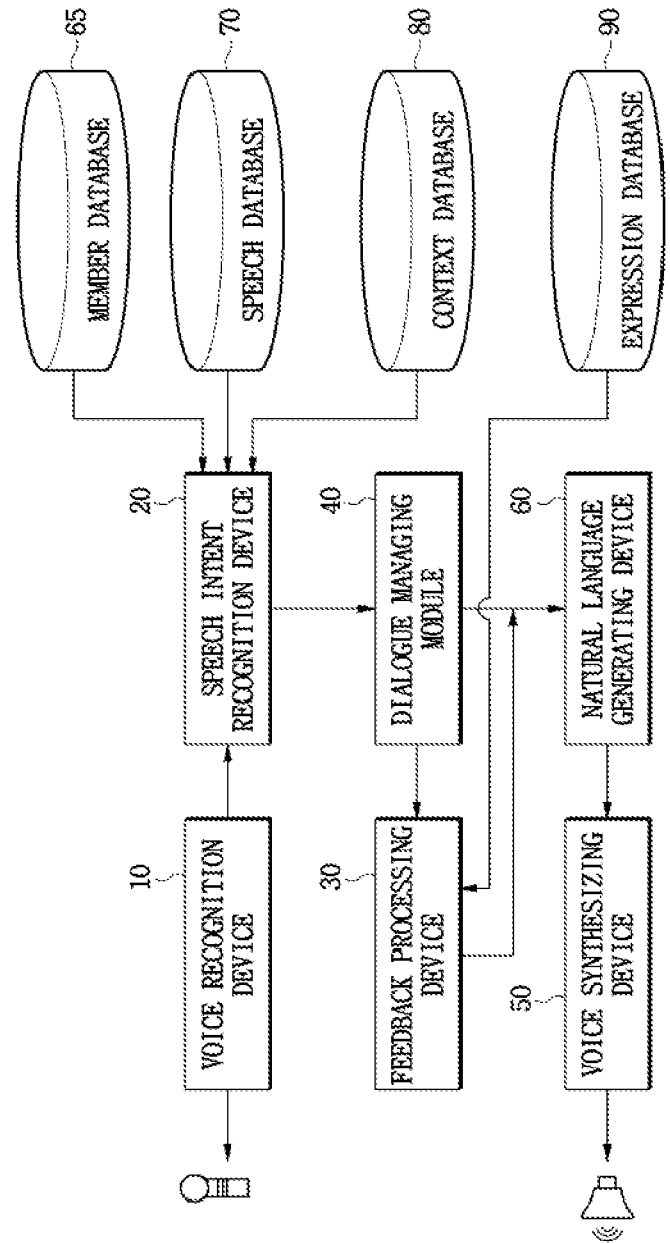
FIG. 1 is a block diagram of an apparatus for foreign language study in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

First, referring to FIGS. 1 and 2, an apparatus for foreign language study in accordance with an embodiment of the present invention will be described in detail.

FIG. 1 is a block diagram of the apparatus for foreign language study in accordance with the embodiment of the present invention. FIG. 2 is a conceptual view illustrating a process in which a speech intent recognition device of FIG. 1 extracts a speech intent using a speech-based model and a dialogue context-based model.

Referring to FIG. 1, the apparatus 100 for foreign language study in accordance with the embodiment of the present invention includes a voice recognition device 10, a speech intent recognition device 20, a feedback processing device 30, a dialog managing module 40, a voice synthesizing device 50, a natural language generating device 60, a member database 65, a speech database 70, a context database 80, and an expression database 90.

The voice recognition device 10 is configured to recognize a learner's voice inputted through a mike, convert the recognized voice into a speech text, and transfer the converted speech text to the speech intent recognition device 20. Hereafter, for convenience of description, suppose that the learner is a user who uses Korean as a native language and the voice recognition device 10 is based on a language other than Korean, for example, English. Therefore, the learner studies English while having a talk with the apparatus 100 for foreign language study. Korean or English is only an example, and other languages such as Chinese, Japanese, and German may be applied in the same manner.

The speech intent recognition device 20 is configured to determine a speech intent of the learner using the speech text transferred from the voice recognition device 10. At this time, the speech intent recognition device 20 extracts the speech intention of the learner using a speech-based model and a dialogue context-based model, which are generated on the basis of information stored in the speech database 70 and the context database 80, respectively.

Figure 2:
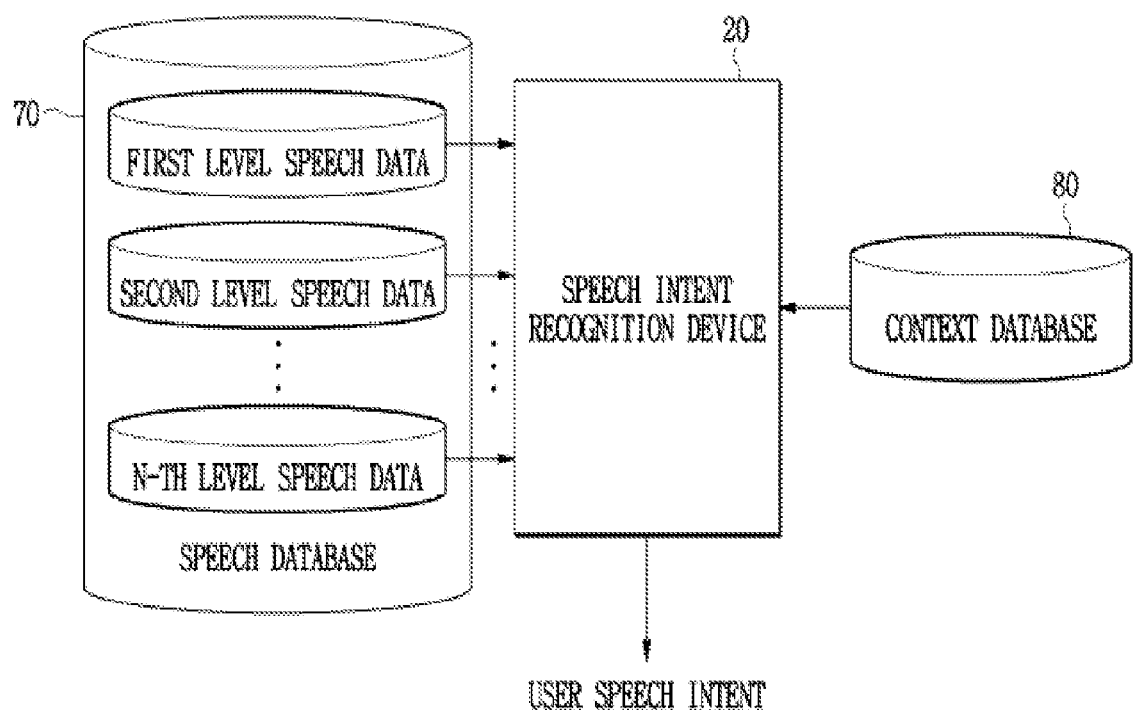
FIG. 2 is a conceptual view illustrating a process in which a speech intent recognition device of FIG. 1 extracts a speech intent using a speech-based model and a dialogue context-based model.

Referring to FIG. 2, the speech database 70 may store first to n-th level data. The first to n-th level data may be obtained by the following process: speech data contained in speeches of the learner, such as words, morphemes, and sentence information, are classified into the first to n-th levels, and speech data corresponding to the same level are separately collected.

The context database 80 may store information on previous speeches of the corresponding learner, a list of dialogues between the learner and the apparatus 100 for foreign language study, and context information on learning content of the learner, such as recommended expressions, alternative expressions, and right expressions, which are provided from the apparatus 100 for foreign language study.

Because of fundamental characteristics of a dialogue, an error or a difference in word use may occur depending on the skill levels of learners. Therefore, the speech-based model is separately modeled for the respective learner levels. That is, the speech-based model is classified into the first to n-th level speech-based models. The speech-based models for the respective levels are built on the basis of philological information depending on the first to n-th speech data of the speech database 70. However, since the flow of dialogue contexts is not nearly changed, the context-based model is generated as one model, and built on the basis of a variety of information of the context database 80.

The speech-based model and the dialog context-based model may apply to various statistics and rule models, in order to acquire a posterior probability. For example, the speech-based model may be generated by a classifier using n-gram information of words forming a speech as features, and the dialog context-based model may be generated by a classifier using a system speech intent in a previous order, a user speech intent in a previous order, a user speech intent in a current order, and information announced by the user till the current order as features. For this operation, various types of classifiers such as maximum entropy and support vector machine, which are frequently used, may be utilized.

The member database 65 may store the personal information, ID, password, and skill level of the learner and information on content studied by the learner. The skill level of the learner may serve as a standard for selecting which speech-based model to apply so that the speech intent recognition device 20 recognizes the speech intent of the learner. That is, when the current skill level of the learner is stored as the third level in the member database 65, the speech intent recognition device 20 estimates the speech intent using the third-level speech-based model.

The speech intent recognition device 20 selects a speech-based model depending on the previously-inputted skill level, and estimates the speech intent and reliability of the speech text from the voice recognition device 10 using the selected speech-based model. Simultaneously, the speech intent recognition device 20 estimates a speech intent and reliability based on dialogue context information, using the dialogue context-based model. The dialogue context information indicates information on a dialogue between the learner and the apparatus 100 for foreign language study, and may include information on all or a part of a dialogue which has proceeded from the beginning of the dialogue to the current order.

The speech intent recognition device 20 statistically combines the speech intent and reliability based on the speech-based model and the speech intent and reliability based on the dialogue context-based model, and extracts a speech intent with the highest probability as a final learner speech intent. As the characteristics for the skill level of the learner and the dialogue context information may be considered together, it is possible to estimate as accurate learner speech intent as possible, even though an error is contained or the learner's speech is immature.

As this time, the speech intent recognition device 20 may use various statistical methodologies such as mutual information measure, which are typically used for model combination, in order to combine the speech-based model and the dialogue context-based model.

The dialogue managing module 40 is configured to determine (1) whether or not a learner's speech is right, based on the learner speech intent and the speech text from the speech intent recognition device 20, (2) whether or not a speech was inputted from the learner within a preset time, and (3) whether or not the learner explicitly requested a help.

(1) When determining that the learner's speech is right, the dialogue managing module 40 generates a proper response to the speech text of the learner by considering the learner speech intent and the current dialogue context, and transfers the generated response to the natural language generating device 60. For example, when the learner correctly pronounced "What kind of music do you listen to?", the dialogue managing module 40 may generate a response such as "I usually listen to country module.".

(2) When a learner's speech is not inputted within the preset time, the dialogue managing module 40 transfers the speech text and the speech intent of the learner to the feedback processing device 30.

(3) When the learner presses a "Help me" button displayed on a screen or says "Help me", "I don't know", or "I don't know what to say" in person, the dialogue managing module 40 requests feedback from the feedback processing device 30.

The feedback processing device 30 feeds back various expressions to the learner, when a preset condition is satisfied. That is, the feedback processing device 30 provides a recommended expression, a right expression, and an alternative expression, (i) when a learner's speech is not inputted within the preset time or help is explicitly requested from the learner, (ii) when it is determined that the learner's speech is not right, and (iii) when the learner's speech is right but a similar expression needs to be learned, respectively.

Meanwhile, the expression database 90 is configured to store a recommended expression, a right expression, and an alternative expression for each speech intent or each theme based on a dialogue context, and provide a corresponding expression according to a request from the feedback processing device 30.

(i) When a Response Time is Exceeded or a Help is Explicitly Requested

When the learner does not know what to say during the dialogue and cannot continue a dialogue sentence, the learner may not speak for a predetermined time or more. In this case, the dialogue managing module 40 informs the feedback processing device 30 that the response time passed, and transfers the dialogue content of the learner to the feedback processing device 30. Then, the feedback processing device 30 selects a theme according to the dialogue context of the learner by considering the current dialogue context information, and extracts a sentence capable of continuing the dialogue following the final dialogue sentence as a recommended expression from the expression database 90.

(ii) When a Learner's Speech is not Right

When it is determined that the learner's speech is not right, the feedback processing device 30 selects a sentence which best coincides with the speech intent of the learner from the expression database 90, by considering the dialogue context, and extracts the selected sentence as a right expression.

(iii) When a Learner's Speech is Right

When it is determined that the learner's speech is right, the feedback processing device 30 selects another expression having the same meaning as or a similar meaning to the learner's speech from the expression database 90, and extracts the selected expression as an alternative expression.

The natural language generating device 60 is configured to convert the conceptual response generated by the dialogue managing module 40 or the feedback processing device 30 into a natural language speech. Although not illustrated separately in the drawing, the natural language generating device 60 may output the natural language speech in a text form on the display screen.

The voice synthesizing device 50 is configured to synthesize a voice pronounced by a native speaker, based on the natural language speech generated by the natural language generating device 60, and output the synthesized voice through a speaker, a headphone, or an earphone.

As described above, the apparatus 100 for foreign language study in accordance with the embodiment of the present invention may extract a learner speech intent based on the dialogue context-based model and the speech-based models built for the respective skill levels of learners. Thus, the apparatus 100 for foreign language study may reliably extract the learner speech intent, even though an error is contained or a learner's speech is immature. Furthermore, the apparatus 100 for foreign language study may feed back expressions suitable for various situations to the learner such that the learner catches his/her error by himself/herself and continues the dialogue while learning a similar expression.

The apparatus 100 for foreign language study in accordance with the embodiment of the present invention may be implemented in the form of an independent server, and the learner may have a talk with the apparatus 100 for foreign language study, using a user terminal such as a computer, a personal digital assistant (PDA), or a wired/wireless telephone. In this case, the user terminal and the apparatus 100 for foreign language study may be connected through a wired/wireless communication network. On the other hand, the apparatus 100 for foreign language study may be implemented as an independent device. In this case, the learner may carry and use the apparatus 100 for foreign language study, or use the apparatus 100 for foreign language study while facing the apparatus 100 for foreign language study.

Furthermore, all or a part of functions of the apparatus 100 for foreign language study may be implemented in a user terminal or intelligent robot. Furthermore, the apparatus 100 for foreign language study not only may be used as an apparatus for foreign language study, but also may be combined with various contents such as shopping and business. Furthermore, the apparatus 100 for foreign language study may be applied to a dialogue system capable of having a talk with a user or a natural language processing artificial intelligence agent, in order to provide a specific service to the user.

The member database 65, the speech database 70, the context database 80, and the expression database 90 may be implemented as one database. In this embodiment of the present invention, it has been described that the apparatus 100 for foreign language study includes the member database 65, the speech database 70, and the context database 80. However, the databases are not necessarily included in the apparatus 100 for foreign language study, and one or more of the databases may be separately implemented outside the apparatus 100 for foreign language study or omitted.

Now, a method for foreign language study in accordance with another embodiment of the present invention will be described in detail with reference to FIGS. 3 and 4.

FIG. 3 is a flow chart showing a process of extracting a speech intent according to the method for foreign language study in accordance with the embodiment of the present invention. FIG. 4 is a flow chart showing a process of responding to a learner according to the method for foreign language study in accordance with the embodiment of the present invention.

First, when a speech is inputted from the learner at step S300 as illustrated in FIG. 3, the voice recognizing device 10 recognizes the learner's voice, converts the recognized voice into a speech text, and transfers the converted speech text to the speech intent recognition device 20 at step S310. The speech intent recognition device 20 estimates a speech intent and reliability based on dialogue context information, using the dialogue context-based model, at step S325. Simultaneously, the speech intent recognition device 20 selects a speech-based model depending on the skill level of the learner, among the first to n-th level speech-based models, and estimates a speech intent and reliability based on the speech text of the learner, using the selected speech-based model, at step S320. Then, the speech intent recognizing device 20 synthesizes the speech intent and reliability based on the speech-based model, synthesizes the speech intent and reliability based on the dialogue context-based model, and extracts the final speech intent of the learner at step S330. The speech intent recognition device 20 transfers the extracted learner speech intent to the dialogue managing module 40 at step S340.

Referring to FIG. 4, the dialogue managing module 40 determines whether or not a speech is inputted from the learner within a preset time, at step S400. When a speech is inputted within the preset time (S400—Y), the dialogue managing module 40 determines whether or not the inputted speech is a speech to explicitly request a help, at step S410. The step S410 may be performed according to an input of a help request button by the learner, regardless of the learner's speech.

When determining that the inputted speech is not a speech to explicitly request a help (S410—N), the dialogue managing module 40 determines whether or not the learner's speech is right at step S420. When determining that the learner's speech is right (S420—Y), the dialogue managing module 40 generates a proper response to the learner's speech by considering the learner speech intent and the dialogue context from the speech intent recognition device 20 at step S430. When determining that the learner's speech is not right (S420—N), the dialogue managing module 40 transfers the control to the feedback processing device 30, and the feedback processing device 30 extracts a right expression from the expression database 90 by considering the learner speech intent and the dialogue context.

When a speech is not inputted within the preset time (S400—N) or the inputted speech is a speech to explicitly request a help (S410—Y), the dialogue managing module 40 transfers the control to the feedback processing device 30, and the feedback processing device 30 extracts a recommended expression from the expression database 90 based on the dialogue context information, at step S450.

Meanwhile, when the learner's speech is right (S420—Y), the feedback processing device 30 extracts an alternative expression having the same meaning as or a similar meaning to the learner's speech from the expression database 90 at step S440.

The natural language generating device 60 converts the response generated by the dialogue managing module 40 and the feedback processing device 30 into a natural language speech at step S450. Then, the voice synthesizing device 50 synthesizes a voice pronounced by a native speaker based on the converted natural language speech at step S460.

The apparatus 100 for foreign language study may output the synthesized voice through a speaker or the like, and separately output the natural language speech in a text form on the display screen, if necessary.

When the learner cannot continue a dialogue or explicitly requests a help, the learner may receive a recommended expression from the apparatus 100 for foreign language study and continue the dialogue. When the learner's speech is not right, the learner may receive a right expression to correct an error. Furthermore, since the learner may naturally understand his/her weak points through the dialogue, the learner may study a foreign language without receiving stress. Furthermore, even when the learner makes a right speech, the learner may receive another expression having the same meaning, thereby widening the expression range of foreign language.

According to the embodiments of the present invention, the intent of a learner's speech may be determined according to a language characteristic for each level of the learner and a dialogue context. Therefore, even though the skill level of the learner is low, the learner speech intent may be accurately determined, and thus a response coinciding with the speech intent may be provided to the learner. Furthermore, customized expressions for various situations may be provided to the learner, which makes it possible for the learner to study a foreign language while stress received by the learner is minimized. Since the learner may receive various expressions and repetitively practice the foreign language, the learner may study the foreign language at a low cost.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:
1. An apparatus for speech intent recognition, comprising:
a speech recognition device configured to recognize a speech entered by a user and convert the speech into a speech text;

a speech intent recognition device configured to extract a user speech intent for the speech text using skill level information of the user and dialogue context information; and
a feedback processing device configured to extract an expression depending on the user speech intent and a speech situation of the user,
wherein the speech intent recognition device selects a speech-based model among a plurality of speech-based models based on the skill level information of the user, estimates a speech intent for the speech text using the selected speech-based model, estimates a speech intent based on the dialogue context information using a dialogue context-based model, and combines the speech intent based on the speech-based model and the speech intent based on the dialogue context-based model to extract the user speech intent,
wherein the apparatus for speech intent recognition outputs the expression extracted by the feedback processing device as a voice through a speaker or as a text form on a display screen,
wherein the plurality of speech-based models are separately modeled for respective learner levels and classified into the respective learner levels based on philological information,
wherein the dialogue context-based model is based on a list of speeches previous to the speech entered by the user, and
wherein the speech intent based on the speech-based model and the speech intent based on the dialogue context-based model are simultaneously estimated.

2. The apparatus of claim 1, wherein the speech intent recognition device extracts the user speech intent using the plurality of speech-based models which are separately generated for skill levels of the user and the dialogue context-based model which is generated by considering the dialogue context information.

3. The apparatus of claim 1, further comprising a dialogue managing module configured to generate a response to the speech text according to the user speech intent and the dialogue context information.

4. The apparatus of claim 1, wherein, when a speech of the user is not inputted within a preset time or a help request is made from the user, the feedback processing device extracts a recommended expression from a database and provides the recommended expression to the user.

5. The apparatus of claim 1, wherein, when the user's speech is right, the feedback processing device extracts an alternative expression having the same meaning as or a similar meaning to the user's speech from a database, and provides the alternative expression to the user.

6. The apparatus of claim 1, further comprising:
a natural language generating device configured to convert the expression extracted by the feedback processing device into a natural language speech; and
a voice synthesizing device configured to synthesize the natural language speech converted by the natural language generating device into the voice.

7. The apparatus of claim 1, wherein, when the user's speech is not right, the feedback processing device selects a sentence which best coincides with the user speech intent from a database, extracts the selected sentence as a right expression, and provides the right expression to the user.

8. An apparatus for speech intent recognition, comprising:
a speech recognition device configured to recognize a speech entered by a user and convert the speech into a speech text;
a speech intent recognition device configured to extract a user speech intent for the speech text; and
a feedback processing device configured to extract a recommended expression, a right expression, or an alternative expression according to the user speech intent and a speech situation of the user, and provides the extracted expression to the user,
wherein the speech intent recognition device selects a speech-based model among a plurality of speech-based models based on skill level information of the user, estimates a speech intent for the speech text using the selected speech-based model, estimates a speech intent based on dialogue context information using a dialogue context-based model, and combines the speech intent based on the speech-based model and the speech intent based on the dialogue context-based model to extract the user speech intent,
wherein the apparatus for speech intent recognition outputs the expression extracted by the feedback processing device as a voice through a speaker or as a text form on a display screen,
wherein the plurality of speech-based models are separately modeled for respective learner levels and classified into the respective learner levels based on philological information,
wherein the dialogue context-based model is based on a list of speeches previous to the speech entered by the user, and
wherein the speech intent based on the speech-based model and the speech intent based on the dialogue context-based model are simultaneously estimated.

9. The apparatus of claim 8, wherein the feedback processing device extracts the recommended expression from a database when a speech of the user is not inputted within a preset time or a help request is made from the user, selects a sentence which best coincides with the user speech intent from a database when the user's speech is not right, and extracts the alternative expression from a database when the user's speech is right.

10. A dialogue system comprising:
a speech recognition device configured to recognize a speech entered by a user and convert the speech into a speech text; and
a speech intent recognition device configured to extract a user speech intent for the speech text using a plurality of speech-based models which are separately generated for skill levels of the user and a dialogue context model generated by considering dialogue context information,
wherein the speech intent recognition device selects one of the plurality of speech-based models based on the skill level information of the user, estimates a speech intent for the speech text using the selected speech-based model, estimates a speech intent based on the dialogue context information using the dialogue context-based model, and combines the speech intent based on the speech-based model and the speech intent based on the dialogue context-based model to extract the user speech intent,
wherein the speech intent recognition device extracts an expression depending on the user speech intent and a speech situation of the user, and outputs the extracted expression as a voice through a speaker or as a text form on a display screen,
wherein the plurality of speech-based models are separately modeled for respective learner levels and classified into the respective learner levels based on philological information, wherein the dialogue context-based model is based on a list of speeches previous to the speech entered by the user, and wherein the speech intent based on the speech-based model and the speech intent based on the dialogue context-based model are simultaneously estimated.

* * * * *